United States Patent
You

(10) Patent No.: US 7,080,617 B2
(45) Date of Patent: Jul. 25, 2006

(54) METHOD FOR CONTROLLING IDLE STOP-AND-GO SYSTEM

(75) Inventor: Sung Il You, Gwacheon (KR)

(73) Assignee: Hyundai Motor Corporation, Seoul (KR)

(*) Notice: Subject to any disclaimer, the term of this patent is extended or adjusted under 35 U.S.C. 154(b) by 0 days.

(21) Appl. No.: 10/991,212

(22) Filed: Nov. 17, 2004

(65) Prior Publication Data

US 2005/0103302 A1    May 19, 2005

(30) Foreign Application Priority Data

Nov. 17, 2003   (KR) .................. 10-2003-0081018

(51) Int. Cl.
*F02N 11/04*   (2006.01)
(52) U.S. Cl. .................................. 123/179.4
(58) Field of Classification Search .............. None
See application file for complete search history.

(56) References Cited

U.S. PATENT DOCUMENTS

2003/0089326 A1*   5/2003   Ujifusa ................. 123/179.4

FOREIGN PATENT DOCUMENTS

| JP | 2003-148313 | 5/2003 |
| JP | 2003-269211 | 9/2003 |
| KR | 10-1999-0077857 | 10/1999 |
| KR | 20-2000-0014118 | 7/2000 |

* cited by examiner

*Primary Examiner*—Andrew M. Dolinar
(74) *Attorney, Agent, or Firm*—Morgan Lewis & Bockius LLP

(57) ABSTRACT

A system and method for controlling an idle stop-and-go in which an engine control mode is determined according to states and conditions of an engine, so that load calculation of the engine contact unit can be reduced and the engine and the integrated starter generator can be stably controlled.

2 Claims, 2 Drawing Sheets

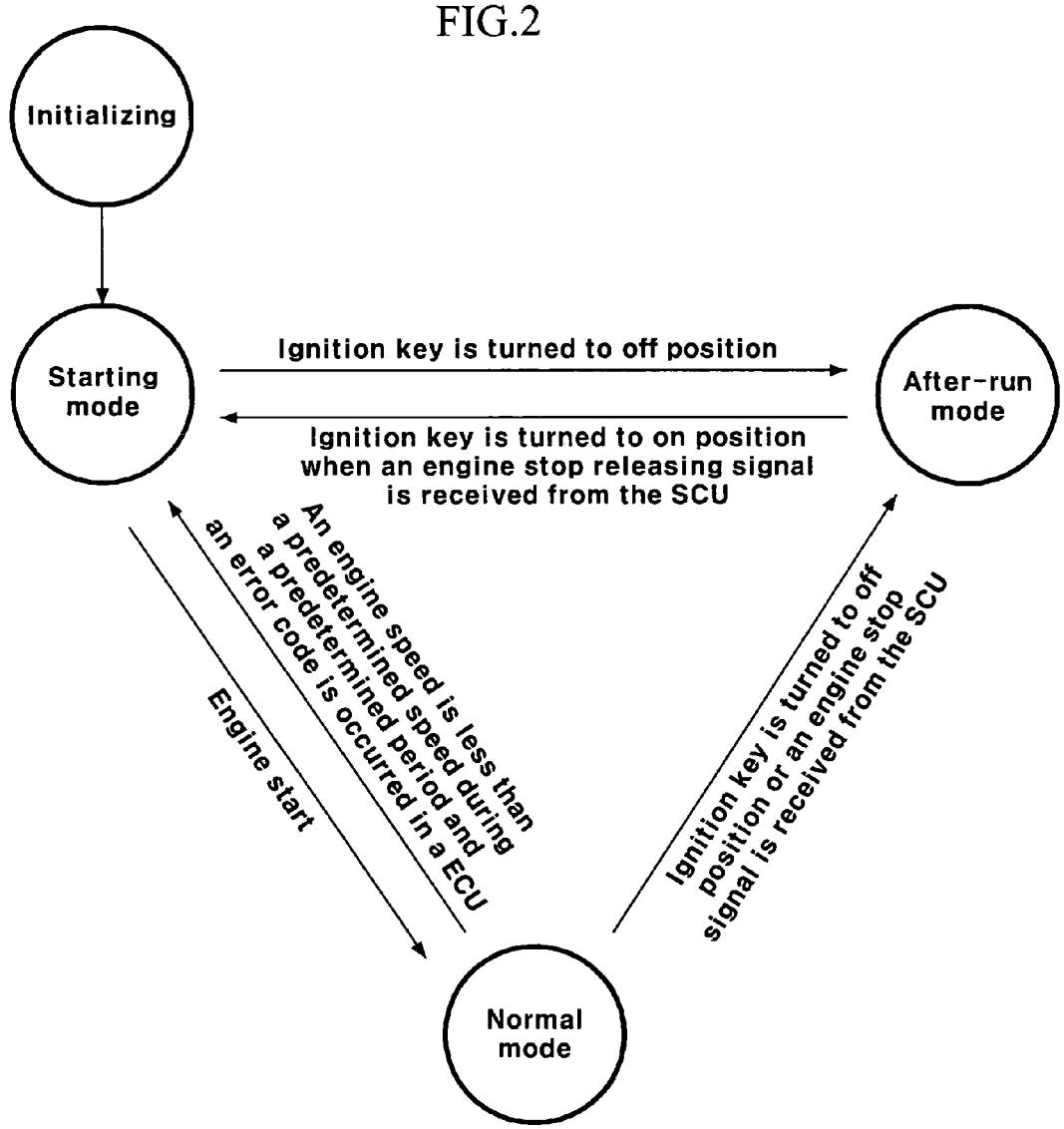

METHOD FOR CONTROLLING IDLE STOP-AND-GO SYSTEM

CROSS-REFERENCE TO RELATED APPLICATIONS

This application claims priority of Korean Application No. 10-2003-0081018, filed Nov. 17, 2004, the disclosure of which is incorporated herein by reference.

FIELD OF THE INVENTION

Generally, the present invention relates to a method for controlling an idle stop-and-go system.

BACKGROUND OF THE INVENTION

A typical idle stop-and-go system is a system for improving fuel efficiency by preventing unnecessary fuel consumption, due to engine idling, by stopping an operation of an engine while a vehicle is not moving. When the vehicle stops, the idle stop-and-go system automatically stops the engine several seconds later. Subsequently, in the case that a driver's intention to drive the vehicle is detected, for example, when a brake pedal is released or a gear is changed, the system automatically restarts the engine even without operation of an ignition key.

A conventional idle stop-and-go system is controlled without considering conditions of engine state or a position of the ignition key. Therefore, in the conventional idle stop-and-go system, there is a problem that an idle stop-and-go control is not stable.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide a method for controlling an idle stop-and-go system having non-limiting advantages of controlling the idle stop-and-go system according to states and conditions of the engine.

An exemplary method for controlling an idle stop-and-go system according to an embodiment of the present invention includes one or more engine control modes, wherein the one or more engine control modes comprise: a starting mode, wherein the engine control unit (ECU) starts an engine by an engine stop release signal received from the starter/generator control unit (SCU); a normal mode for normally operating the engine; and an after-run mode, wherein the ECU stops the engine based on an engine stop signal received from the SCU.

In a further embodiment, the ECU changes the engine control mode from the starting mode to the normal mode after the engine starts.

In another further embodiment, the ECU changes the engine control mode to the after-run mode in the case that an ignition key is turned to an off position or an engine stop signal is received from the SCU at the normal mode.

In another further embodiment, the ECU changes the engine control mode to the starting mode in the case that an engine stop releasing signal is received from the SCU at the after-run mode while an ignition key is in an on position.

In another further embodiment, the ECU changes the engine control mode to the after-run mode in the case that an ignition key is turned to the off position at the starting mode.

In another further embodiment, the ECU changes the engine control mode to the starting mode if an engine speed is less than a predetermined speed for a predetermined period and an error code occurs in the ECU.

In an alternative embodiment of the invention, an engine idle stop-and-go control system, comprises an engine control unit and a starter generator control unit interconnected with the engine control unit. The system also may comprise a starter motor configured for initial engine starting and an integrated starter generator controlled by the starter generator control unit. The starter generator if included is configured for engine restarts when engine coolant temperature is higher than a preset threshold temperature.

In a preferred embodiment, the engine control unit is programmed with plural operating modes, comprising a starting mode wherein the engine control unit starts the engine in response to an engine stop release signal received from the starter generator control unit, a normal mode for normally operating the engine, and an after-run mode wherein the engine control unit stops the engine based on an engine stop signal received from the starter generator control unit. Additional control may be programmed as in the method summarized above.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is a flowchart showing a method for controlling the idle stop-and-go system according to an embodiment of the present invention.

DETAILED DESCRIPTION OF THE PREFERRED EMBODIMENTS

Figure 1:
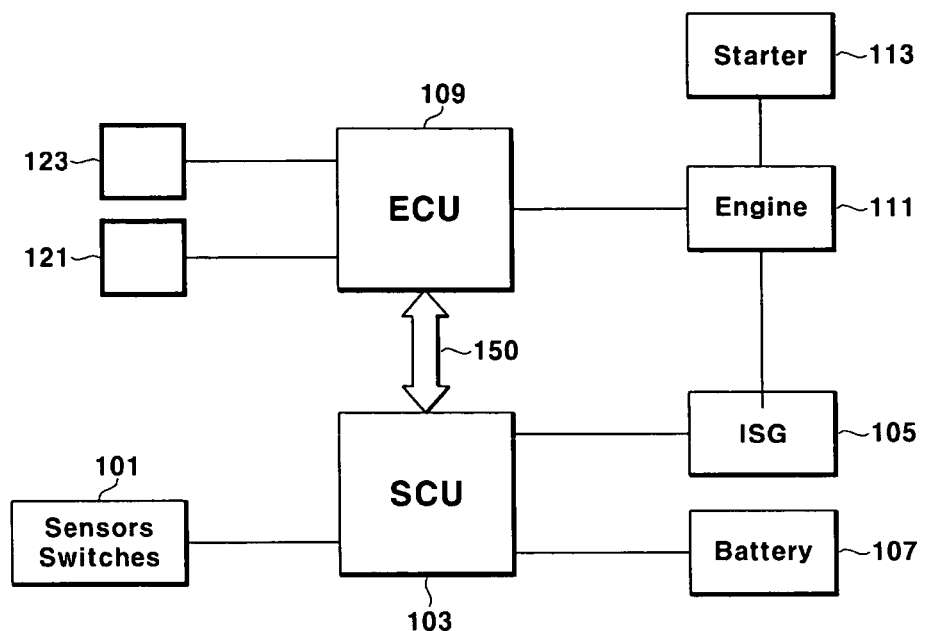
FIG. 1 is a schematic diagram of rawing showing an idle stop-and-go system according to an embodiment of the present invention.

An embodiment of the present invention will hereinafter be described in detail with reference to the accompanying drawings.

As shown in FIG. 1, according to an embodiment of the present invention, an idle stop-and-go system includes: an engine control unit (ECU) 109 for controlling an engine 111; an integrated starter generator (ISG) 105 for starting the engine 111 and charging a battery 107; a starter/generator control unit (SCU) 103 for controlling the ISG 105; and one or more sensors and switches 101.

The SCU 103 and the ECU 109 can be respectively realized by one or more processors activated by a predetermined program, and the predetermined program can be programmed by a person skilled in the art to perform each step of a method according to an embodiment of this invention based on the teachings herein. The SCU 103 and the ECU 109 are interconnected to each other through a network 150 such as a controller area network (CAN), to communicate various data with each other.

The ECU 109 may be connected to an engine speed sensor 121 and an ignition switch 123 to receive signals therefrom. The engine speed sensor 121 detects an engine speed (rpm) and generates a corresponding engine speed signal, and the ignition switch 123 generates an ignition-on signal or an ignition-off signal corresponding to an operating position of an ignition key.

Hereinafter, a basic operating principal of the idle stop-and-go system according to an embodiment of the present invention is described.

The ISG 105 can operate as both a starter to start the engine 111 and a generator to charge the battery 107, and may be driven by a belt. Because the ISG 105 may be driven by the belt, noise can be substantially reduced.

The SCU 103 determines whether an idle stop is needed or an idle stop release is needed and generates a corresponding engine control signal (i.e., an engine stop signal or an engine stop releasing signal), and the ECU 109 controls operations of the engine 111 based on the engine stop signal or the engine stop releasing signal received from the SCU 103.

An initial start of the engine 111 is performed by a conventional starter 113 to increase an engine start ability in a cold circumstance, and a restart of the engine 111 is performed by the ISG 105 after a coolant temperature becomes higher than a predetermined temperature. Because the predetermined temperature is obvious to a person having ordinary skill in the art, detailed description is omitted herein.

After engine 111 has been started, the ISG 105 automatically charges the battery 107.

As shown in the FIGS. 1 and 2, the method for controlling idle stop-and-go system is described hereinafter.

The ECU 109 determines an engine control mode among a plurality of engine control modes including: an initialization mode; a starting mode; a normal mode; and an after-run mode, on the basis of signals received from the ignition switches 123, the engine speed sensor 121, and the SCU 103.

In the initialization mode, the ECU 109 and the SCU 103 are initialized.

The engine 111 can normally be started in the starting mode by the signal from the SCU 103. That is, in the starting mode, the ISG 105 is maintained in a state in which the ISG 105 can perform a function of a start motor.

In addition, the ECU 109 changes the engine control mode from the starting mode to the normal mode after the engine 111 starts.

In the normal mode, the engine 109 operates normally. In the normal mode, the ECU 109 receives signals from the engine speed sensor 121, the ignition switch 123, and the SCU 103.

The ISG 105 is operated as an alternator in the normal mode.

If the engine stop signal for an idle stop is received from the SCU 103 in the normal mode, the ECU 109 changes the engine control mode from the normal mode to the after-run mode even if an ignition key is maintained in an on position.

In the case that the ignition key is turned to an off position while the engine control mode is in the normal mode, the engine control mode is also changed to the after-run mode by the ECU 109.

In this case, in the after-run mode, the engine 111 is not immediately stopped (that is, the ECU 109 does not immediately shut off a power supply to the engine), but the engine 111 is stopped after engine trouble check and diagnosis are performed for several seconds. Finally, the engine 111 is stopped in the after-run mode.

The SCU 103 monitors signals received from the switches and sensors 101 during the after-run mode, while doing so, if a restart condition is satisfied, the engine control mode is immediately changed from the after-run mode to the starting mode.

The restart condition is determined to be satisfied if the ignition key is turned to an on position in the after-run mode or if the engine stop releasing signal is received from the SCU 103 in the after-run mode.

After the engine 111 stopped, the SCU 103 does not request engine stop any more.

The ECU 109 changes the engine control mode to the after-run mode in the case that the ignition key is turned to an off position at the starting mode.

Meanwhile, the ECU 109 changes the engine control mode to the starting mode if the engine speed is less than the predetermined speed during a predetermined period and an error code occurs in the ECU 109.

As described above, in the method for controlling an idle stop-and-go system according to an embodiment of the present invention, an engine control mode is determined according to states and conditions of an engine, so that a calculation load of the ECU can be reduced and the engine and the ISG can be controlled stably.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling an idle stop-and-go system based on one or more engine control modes, wherein the one or more engine control modes comprise: a starting mode, wherein an engine control unit (ECU) starts an engine by an engine stop release signal received from a starter/generator control unit (SCU); a normal mode for normally operating the engine; and an after-run mode, wherein the ECU stops the engine based on an engine stop signal received from the SCU. wherein the ECU changes the engine control mode to the after-run mode in the case that an ignition key is turned to an off position at the starting mode.

2. An engine idle stop-and-go control system, comprising:
an engine control unit;
a starter generator control unit interconnected with the engine control unit; and
a starter motor configured for initial engine starting: and
an integrated starter generator controlled by the starter generator control unit, said starter generator configured for engine restarts when engine coolant temperature is higher than a preset threshold temperature;
wherein said engine control unit is programmed with instructions comprising:
plural operating modes, including comprising:
a starting mode wherein the engine control unit starts the engine in response to an engine stop release signal received from the starter generator control unit;
a normal mode for normally operating the engine; and
an after-run mode wherein the engine control unit stops the engine based on an engine stop signal received from the starter generator control unit;
changing the engine control mode from the starting mode to the normal mode after the engine starts;
changing the engine control mode to the after-run mode in the case that an ignition key is turned to off or an engine stop signal is received from the starter generator control unit while in the normal mode;

changing the engine control mode to the starting mode in the case that an engine stop releasing signal is received from the starter generator control unit while in the after-run mode when an ignition key is on;

changing the engine control mode to the after-run mode in the case that an ignition key is turned to off while in the starting mode; and changing the engine control mode to the starting mode if engine speed is less than a predetermined speed for a predetermined period and an error code occurs in the engine control unit.

* * * * *